United States Patent
Dudgeon et al.

(10) Patent No.: US 9,563,636 B2
(45) Date of Patent: *Feb. 7, 2017

(54) ALLOWING WRITES TO COMPLETE WITHOUT OBTAINING A WRITE LOCK TO A FILE

(71) Applicant: International Business Machines Corporation, Armonk, NY (US)

(72) Inventors: Kyle B. Dudgeon, Tucson, AZ (US); David C. Reed, Tucson, AZ (US); Esteban Rios, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/559,826

(22) Filed: Dec. 3, 2014

(65) Prior Publication Data

US 2015/0134630 A1    May 14, 2015

Related U.S. Application Data

(63) Continuation of application No. 13/192,573, filed on Jul. 28, 2011, now Pat. No. 8,954,408.

(51) Int. Cl.
*G06F 17/30* (2006.01)

(52) U.S. Cl.
CPC ... *G06F 17/30171* (2013.01); *G06F 17/30371* (2013.01)

(58) Field of Classification Search
None
See application file for complete search history.

(56) References Cited

U.S. PATENT DOCUMENTS

| 5,455,947 A | 10/1995 | Suzuki et al. |
| 7,899,794 B2 | 3/2011 | Bhatt et al. |
| 2003/0182285 A1 | 9/2003 | Kuwata et al. |
| 2004/0010499 A1 | 1/2004 | Ghosh et al. |
| 2005/0066095 A1* | 3/2005 | Mullick ............ G06F 17/30171 710/200 |
| 2006/0230411 A1* | 10/2006 | Richter .................. G06F 9/526 719/328 |

(Continued)

OTHER PUBLICATIONS

Office Action 1, Nov. 21, 2013, for U.S. Appl. No. 13/192,573, filed Jul. 28, 2011 by K.B. Dudgeon et al., Total 12 pp. [18.415 (OA1)].

(Continued)

*Primary Examiner* — Anh Tai Tran
(74) *Attorney, Agent, or Firm* — David W. Victor; Konrad Raynes Davda & Victor LLP

(57) ABSTRACT

Provided are a computer program product, system, and method for allowing writes to complete without obtaining a write lock to a file. A lock is provided to a first request, comprising a read or write request, to access the file. A second write request is received while the first request maintains the lock. A temporary file associated with the file for the second write request is created. The second write request is controlled to write to the temporary file while the lock is held by the first request. In response to completing the first request, the lock is granted to the second write request to write the data in the temporary file to the file.

23 Claims, 7 Drawing Sheets

(56) References Cited

U.S. PATENT DOCUMENTS

| | | |
|---|---|---|
| 2008/0134163 A1 | 6/2008 | Golde et al. |
| 2010/0070481 A1 | 3/2010 | Mantena et al. |
| 2012/0124092 A1* | 5/2012 | Teranishi ............. G06F 21/604 707/783 |
| 2013/0031069 A1 | 1/2013 | Dudgeon et al. |

OTHER PUBLICATIONS

Response to Office Action 1, Feb. 21, 2014, for U.S. Appl. No. 13/192,573, filed Jul. 28, 2011 by K.B. Dudgeon et al., Total 14 pp. [18.415 (ROA1)].

Final Office Action 1, Jul. 18, 2014, for U.S. Appl. No. 13/192,573, filed Jul. 28, 2011 by K.B. Dudgeon et al., Total 9 pp. [18.415 (FOA1)].

Response to Final Office Action 1, Sep. 18, 2014, for U.S. Appl. No. 13/192,573, filed Jul. 28, 2011 by K. B. Dudgeon et al., Total 11 pp. [18.415 (RFOA1)].

Notice of Allowance 1, Sep. 30, 2014, for U.S. Appl. No. 13/192,573, filed Jul. 28, 2011 by K.B. Dudgeon et al., Total 9 pp. [18.415 (NOA1)].

Supplemental Amendment, Jul. 7, 2014, for U.S. Appl. No. 13/192,573, filed Jul. 28, 2011 by K.B. Dudgeon et al., Total 9 pp. [18.415 (SuppAmend)].

* cited by examiner

File Metadata

Request Queue Entry

Lock Information

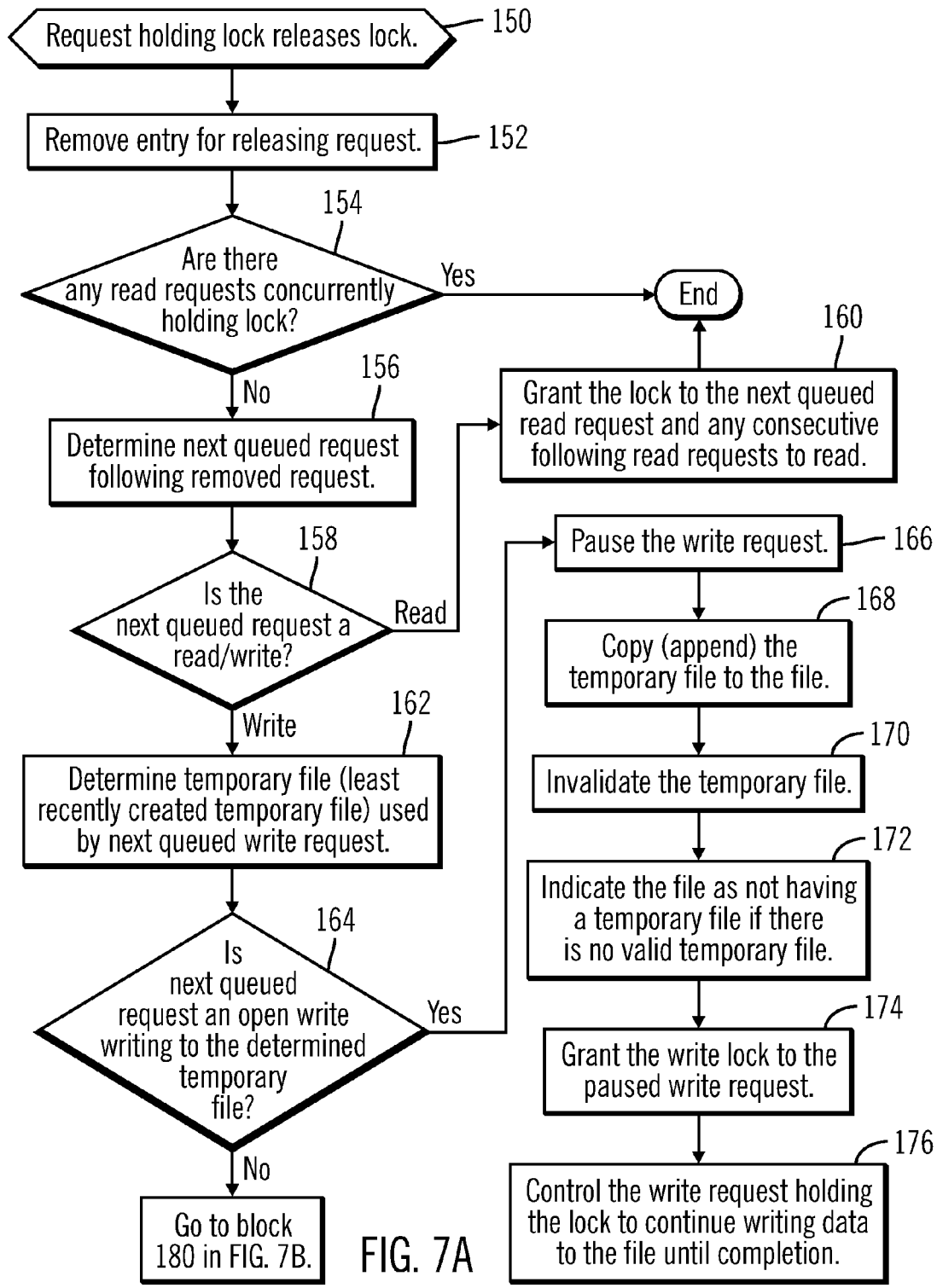

ALLOWING WRITES TO COMPLETE WITHOUT OBTAINING A WRITE LOCK TO A FILE

CROSS-REFERENCE TO RELATED APPLICATION

This application is a continuation of U.S. patent application Ser. No. 13/192,573, filed Jul. 28, 2011, which patent application is incorporated herein by reference in its entirety.

BACKGROUND OF THE INVENTION

1. Field of the Invention

The present invention relates to a computer program product, system, and method for allowing writes to complete without obtaining a write lock to a file.

2. Description of the Related Art

A sequential file is a file to which write data is appended to the end of the file. When a write request is writing to a sequential file, the file is locked and other read and write requests are not allowed to access the file. When a read or write is holding a lock to a file, a subsequent writer has to wait for the first request to release the lock before the update can be applied to the file. A job may consist of multiple read and write requests that can be substantially delayed while waiting for previously received read and write requests to release their locks to the file.

SUMMARY

Provided are a computer program product, system, and method for allowing writes to complete without obtaining a write lock to a file. A lock is provided to a first request, comprising a read or write request, to access the file. A second write request is received while the first request maintains the lock. A temporary file associated with the file for the second write request is created. The second write request is controlled to write to the temporary file while the lock is held by the first request. In response to completing the first request, the lock is granted to the second write request to write the data in the temporary file to the file.

BRIEF DESCRIPTION OF THE DRAWINGS

FIGS. 7a and 7b illustrates an embodiment of operations to process a release of the lock by the request holding the lock.

DETAILED DESCRIPTION

Described embodiments provide techniques to allow write requests to a file to immediately proceed without having to wait for any previous queued requests to obtain and release the lock to the file by allowing the write requests to immediately write to temporary files associated with the file. The updates written to the temporary files are then applied to the file according to the order in which the write requests were received with respect to previously received read and write requests. Described embodiments maintain the write and read order to the file while allowing write requests to complete without having the lock to the file and complete out of write order.

Figure 1:
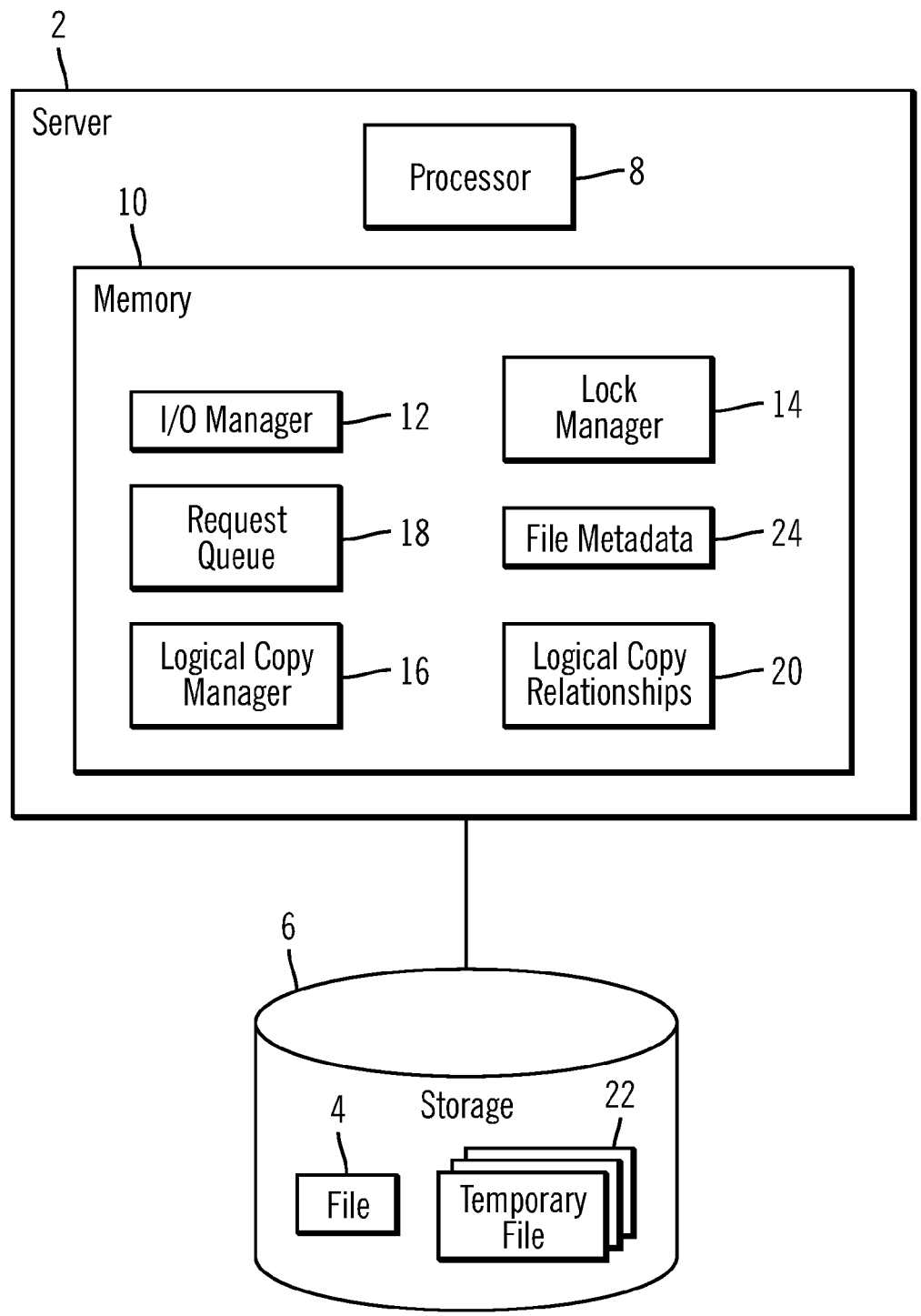
FIG. 1 illustrates an embodiment of a computing environment.

FIG. 1 illustrates an embodiment of a computing environment. A plurality of hosts (not shown) may submit read and write requests to a server 2 to access data in files 4 in a storage 6. The server 2 includes a processor 8 and a memory 10 having an Input/Output (I/O) manager 12 program to manage read and write access to the files 4, a lock manager 14 to manage exclusive and non-exclusive locks for the requests to the file 4, and a logical copy manager 16 to manage logical copy operations, such as FlashCopy®, snapshot, etc. (FlashCopoy is a registered trademark of International Business Machines Corp. in the United States and other countries). The lock manager 14 maintains a request queue 18 having entries for read and write requests waiting for the lock to access the file 4. The logical copy manager 16 maintains logical copy relationships 20 having information on source locations to copy to target locations, where a logical copy operation is completed almost instantaneously after creating the logical copy relationship 20 data structures, but the data is copied over in a background copy operation.

The lock manager 14 creates temporary files 22 for write requests in the request queue 18, so that queued write requests not holding the lock may write their data to the temporary files 22 and complete before they are provided the lock according to the request queue 18 order to write to the file 4. The data in the temporary files 22 is copied over to the file 4 in the order in which the write requests writing to the temporary files were received. The I/O manager 12 and lock manager 14 maintain and access file metadata 24 for files 4 and temporary files 22. Files 4 and temporary files 22 may reside in the storage 6 and the memory 10.

In one embodiment, the memory 10 may comprise a volatile or non-volatile storage, such as a Dynamic Random Access Memory (DRAM), Random Access Memory (RAM) or a non-volatile memory, e.g., battery backed-up Random Access Memory (RAM), static RAM (SRAM), etc. The storage 6 may comprise an array of storage devices, such as a Just a Bunch of Disks (JBOD), Direct Access Storage Device (DASD), Redundant Array of Independent Disks (RAID) array, virtualization device, tape storage, flash memory, solid state storage devices (e.g., EEPROM (Electrically Erasable Programmable Read-Only Memory), flash memory, storage-class memory (SCM)), electronic memory, magnetic tape media, etc.

The I/O manager 12, lock manager 14, and logical copy manager 16 may comprise one or more programs loaded into the memory 10 that are executed by the processor 8 or may be implemented in one or more hardware devices in the server 2, such as in Application Specific Integrated Circuits (ASIC).

Figure 2:
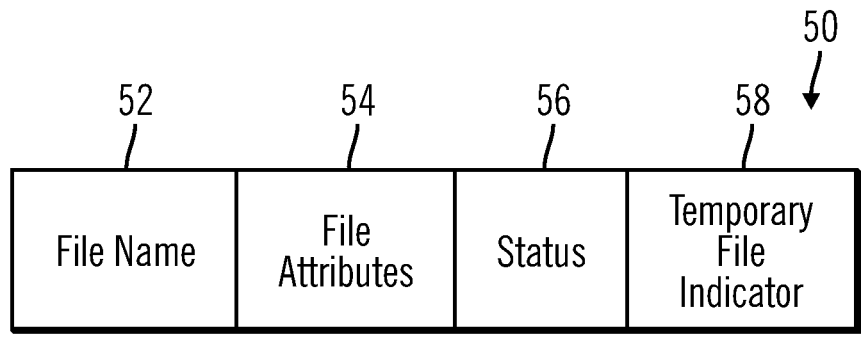
FIG. 2 illustrates an embodiment of file metadata.

FIG. 2 illustrates an embodiment of file metadata 50 for a file 4 that includes a file name 52; file attributes 54, such as record format, block size, record size, etc.; a status 56, such as open or closed; and a temporary file indicator 58 indicating whether there is at least one temporary file 22 created for write requests to the file 4 that do not hold the write lock.

In one embodiment, the temporary files 22 may be created with the same name 52 as the file 54, but include a special character appended to the end of the file name 52 which allows identification of the file as a temporary file and a version of the temporary file to allow the lock manager 14 to determine a particular version of the temporary files, such as least recently or most recently created temporary file 22. Further, the I/O manager 12 may further create file metadata 50 for the temporary files 22, except that the metadata for the temporary files 22 may not include a temporary file indicator 58 field. The temporary files 22 may be created with all the file attributes of the file 6, but allocated with a reduced space allocation relative to the file 6.

Figure 3:
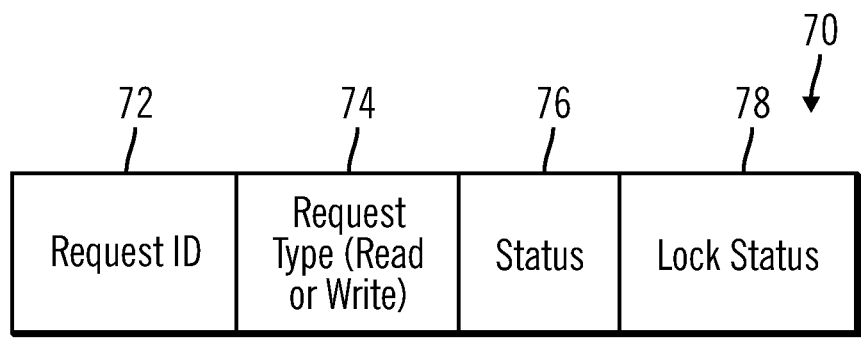
FIG. 3 illustrates an embodiment of a request queue entry.

FIG. 3 illustrates an embodiment of a request queue entry 70 in the request queue 18 created for a received write or read request. The request queue entry 70 includes a request queue identifier (ID) 72 identifying a particular request; a request type 74, such as read or write; a status 76 indicating whether the request is completed, pending or continuing; and a lock status 78 field indicating whether the request identified by the entry 70 is holding a lock, and type of lock, such as exclusive or non-exclusive. There may be multiple instances of the lock information 90 if there are multiple non-exclusive locks.

Figure 4:
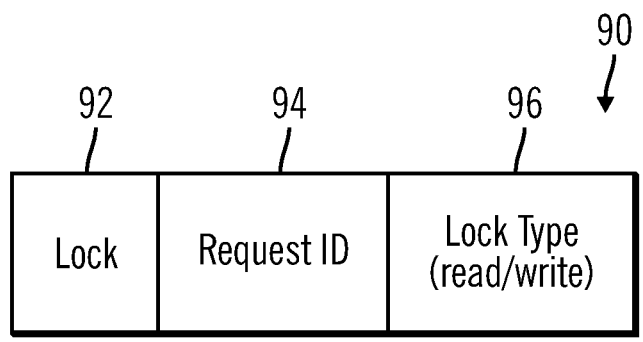
FIG. 4 illustrates an embodiment of lock information.

FIG. 4 illustrates an embodiment of lock information 90 maintained by the lock manager 14, including a lock 92 identifying the lock; a request identifier (ID) 94 identifying the read or write request holding the lock; and a lock type 96, such as read (non-exclusive) or write (exclusive). There may be multiple instances of the lock information 90, such as if multiple read requests hold non-exclusive shared read locks.

Figure 5:
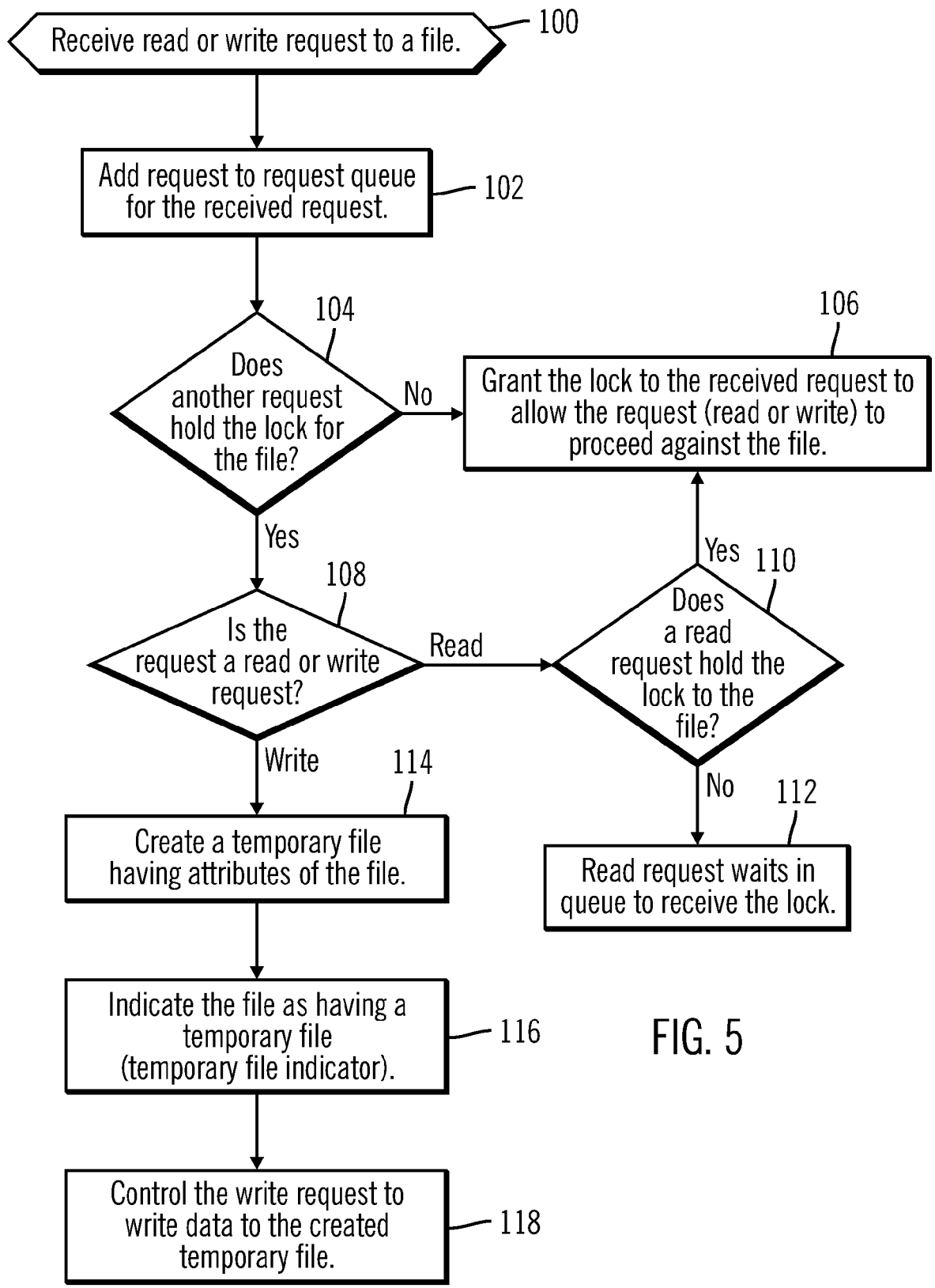
FIG. 5 illustrates an embodiment of operations to process a read or write request to a file.

FIG. 5 illustrates an embodiment of operations performed by the lock manager 14 to provide a lock to a read or write request to the file 4. Upon receiving (at block 100) a read or write request, the lock manager 14 adds (at block 102) a request queue entry 70 to the request queue 18, including the request ID 72, request type 74, status 76 of uncompleted, and lock status 78 of none. If (at block 104) no other request holds the lock for the file, which can be determined from the lock information 90, then the lock is granted (at block 106) to the received request to allow the request to read or write against the file 4. The request ID 94 of the lock information 90 may indicate a request holding the lock of lock type 96 or no request ID if no lock is granted. For writes, the lock 90 would comprise an exclusive lock not allowing any other process to concurrently hold the lock, and for reads, the lock 90 granted would comprise a shared or non-exclusive lock allowing multiple non-exclusive locks to be granted. If (at block 104) another request does hold the lock 90 and if (at block 108) the received request is a read, then the lock manager 14 determines (at block 110) whether another read request holds the lock 90 to the file, i.e., the lock 90 is of a read lock type 96. If so, then the lock manager 14 grants (at block 106) a non-exclusive lock to the received read request. Otherwise, if (at block 110) the lock currently held is for a write request, or an exclusive lock, then the read request has to wait (at block 112) in the queue 18 to receive the lock according to the order in which the read request was received with respect to other requests.

If (at block 108) the request is a write, then the lock manager 14 creates (at block 114) a temporary file 22 having the attributes of the file 112, such as record size, block size, count key data (CKD) format, etc. The lock manager 14 indicates (at block 116) the file 4 as having a temporary file, such as by setting the temporary file indicator 58 in the metadata 50 for the file 4 to indicate that there is a temporary file 22 storing writes for the file 4. The write request is then controlled (at block 118) to write data to the created temporary file 22. In certain embodiments, one separate temporary file 22 is created for each write request that is received while the lock is held by another request. In an alternative embodiment, data from multiple write requests may be written to a single temporary file 22.

Figure 6:
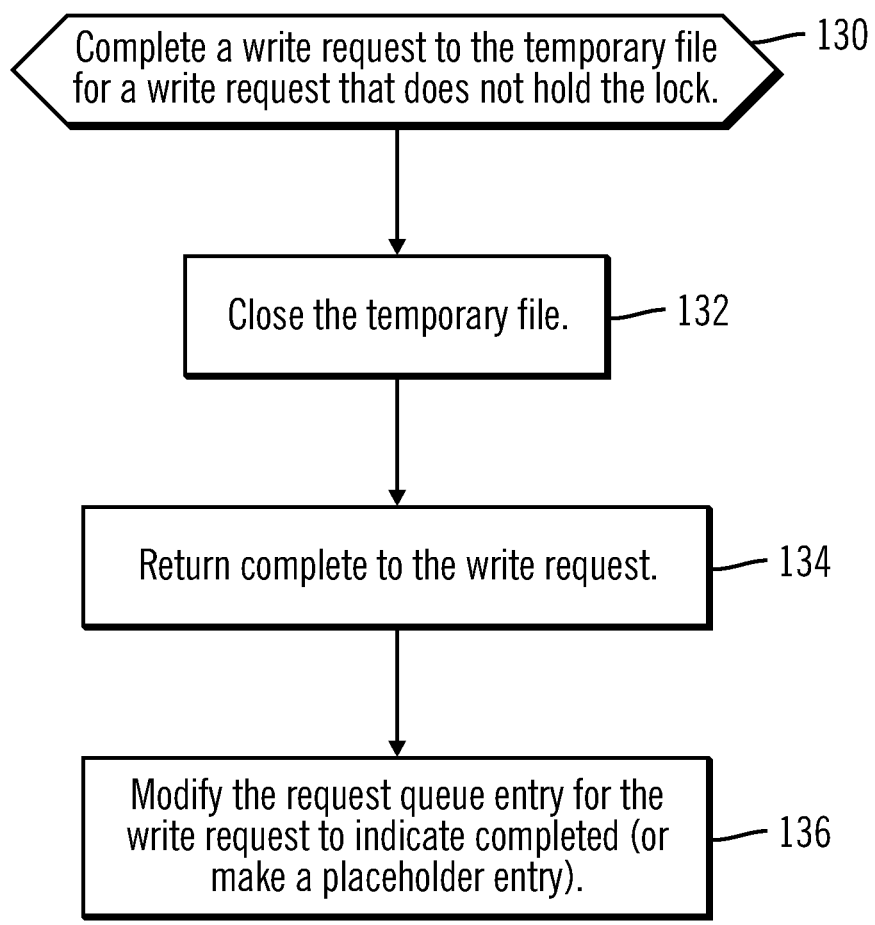
FIG. 6 illustrates an embodiment of operations to complete a write request for the file.

FIG. 6 illustrates an embodiment of operations performed by the lock manager 14 or the lock manager 14 in coordination with the I/O manager 12, to complete a write request to the temporary file 22. Upon (at block 130) a write request completing to a temporary file 22, the I/O manager 12 (or lock manager 14) closes (at block 132) the temporary file 22 and returns (at block 134) complete to the write request. The lock manager 14 then modifies (at block 136) the request queue entry 70 for the write request completing writing to the temporary file 22 to indicate the status 76 as completed. In this way, the lock manager 14 leaves a placeholder for the write request in the request queue 70 after the write to the file completes with respect to the temporary file 22 to ensure that the data for the write request is copied from the temporary file 22 to the file 44 before any read or write requests following the completed write requests can access the file 4. This ensures data integrity and consistency by making sure that all reads and writes are performed against the file according to the order in which they are received.

Figure 7B:
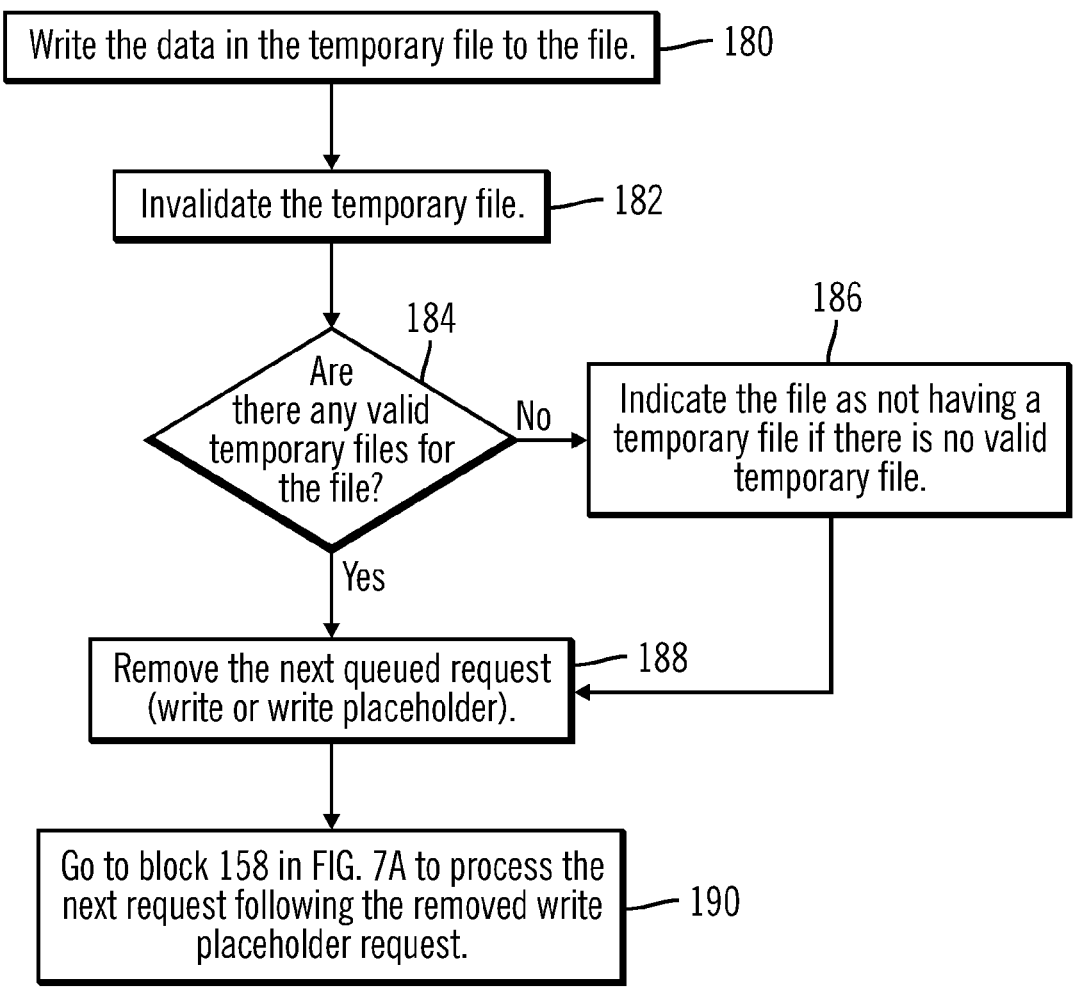

FIGS. 7a and 7b illustrate operations performed by the lock manager 14, or the lock manager 14 in cooperation with the I/O manager 12, to process a release of the lock by a request 70 in the request queue 18. Upon a request 70 releasing (at block 150) the lock 90 being held after completing a read or write operation, the lock manager 14 removes (at block 152) the entry for the releasing request 70 from the request queue 18. If (at block 154) there are any read requests currently holding a read/non-exclusive lock 90, then control ends until all reads release their locks. If (at block 154) there are no read requests currently holding a shared lock, then the lock manager 14 determines (at block 156) a next queued request 70 in the request queue 18 following the removed request. If (at block 158) the next queued request is a read, then the read/non-exclusive lock 90 is granted (at block 160) to the next queued request and any consecutive read requests in the request queue 70 following the next queued request because multiple reads may hold a non-exclusive lock 90 to the file 4.

If (at block 158) the next queued request is a write request, then the lock manager 14 determines (at block 162) the temporary file 22 to which the next queued write request writes, which may comprise the least recently created temporary file 22 because the write request being processed is the least recently added write request. If (at block 164) the next queued write request is an open write, as indicated by the status 76 in the entry 70 for the write request, currently writing to the temporary file 22, then the lock manager 14 pauses (at block 166) the write request and copies (at block 168) the data in the determined temporary file 22 to the file 4. In embodiments where the file 4 comprises a sequential file, the data in the temporary file 22 is appended sequentially to the end of the file 4. The temporary file 22 is then invalidated (at block 170) and the lock manager 14 indicates (at block 172) the file 4 as not having a temporary file 22, in field 58, if there are no other valid temporary files 22 created for the file 22. The existence of temporary files 22 may be determined from a list of temporary files maintained for a file 4 or by searching for any files having the name of the file 4 followed by the special temporary file version characters. The lock manager 14 grants (at block 174) the lock to the paused write request so that the write request holding the lock may switch to writing (at block 176) data to the end of the file 4, after the data copied from the temporary file 22, until completion.

If (at block 164) the next queued write request is not open and currently writing to a temporary file 22, i.e., the temporary file 22 is closed and the write request has completed writing its data to the temporary file 22, then control proceeds to block 180 in FIG. 7b where the write request is controlled to write (at block 180) the data in the temporary file 22 to the file 4. The temporary file 22 is then invalidated (at block 182) after completing the write. If (at block 184) there are no further valid temporary files for the file 4, then the lock manager 14 indicates (at block 186) the file 4 as not having a temporary file by setting field 58. From block 186 or if there are temporary files (from the yes branch of block 184), the lock manager 14 removes (at block 188) the just processed next queued request and proceeds (at block 190) to go back to block 158 in FIG. 7a to process the next request following the just removed and processed write placeholder request.

The operations at block 180 are performed with respect to a write request that has completed to the temporary file 22, such that the entry 70 in the queue after the write completes comprises a placeholder for the write request to ensure that the write request data is applied from the temporary file 22 to the file 4 before any subsequent read or write requests are allowed to proceed to maintain data dependency and consistency with respect to the read and write requests. For instance, if a first operation to write is active, and a second operation to write is followed by a third operation to read, which is followed by a fourth operation to write, then it is possible that the second operation will complete writing to the temporary file 22 before the first operation and the fourth operation complete writing and before the third operation reads. In such case, when the third operation goes to read, the file will have the writes of the first and second operations, but not the completed fourth operation whose writes are maintained in the temporary file 22 until the third operation completes. This ensures that the third operation only sees writes that were in the file 4 when the third operation was received.

Figure 8:
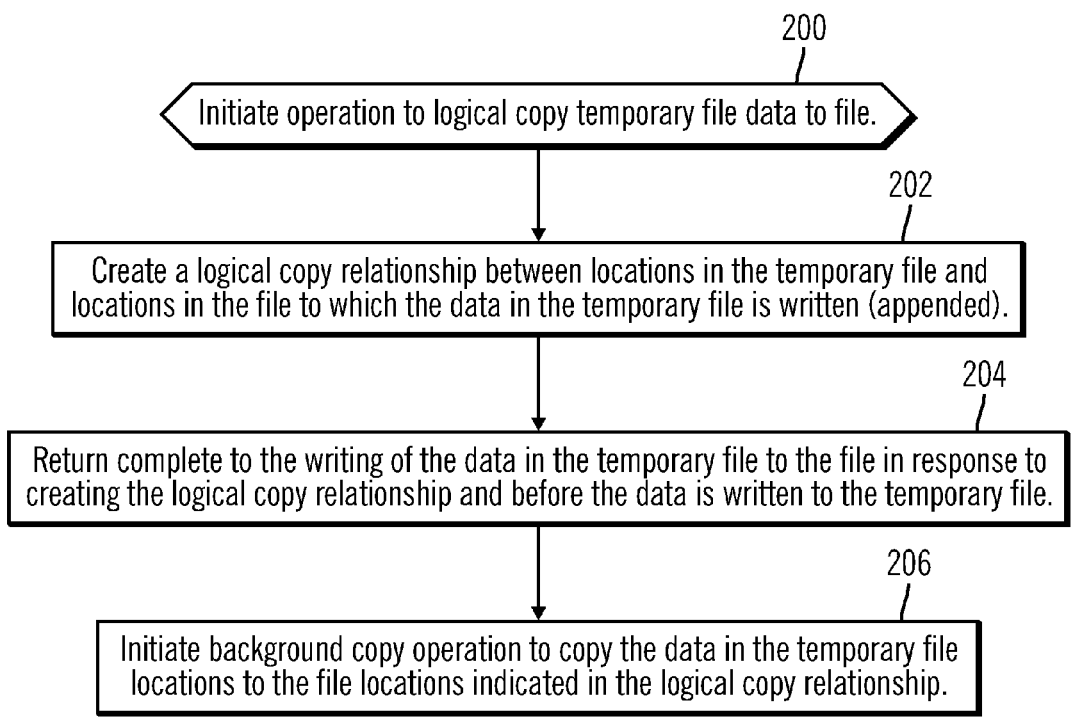
FIG. 8 illustrates an embodiment of operations to perform a logical copy of write data from a temporary file to the file.

FIG. 8 illustrates an embodiment of operations performed by the logical copy manager 16, in coordination with the lock manager 14 and I/O manager 12, to use a logical copy procedure to copy the data in the temporary file 22 to the file 2 at block 168 or 180 in FIGS. 7a, 7b. Upon initiating (at block 200) the logical copy operation to copy/append the data in the temporary file 22 to the file 2, the logical copy manager 16 creates (at block 202) a logical copy relationship 20 between locations in the temporary file 22 and locations in the file 4 to which the data in the temporary file 22 is written (appended). After creating the logical copy relationship 20 information and data structures, which occurs almost instantaneously, and before the data in the temporary file 22 is actually copied to the file 4, the logical copy manager 16 returns (at block 204) complete to the writing of the data in the temporary file 22 to the lock manager 14, so that the lock manager 14 can continue with the operations following blocks 168 and 180 in FIGS. 7a and 7b. The logical copy manager 16 initiates (at block 206) a background copy operation to copy the data in the temporary file 22 locations to the file 4 locations indicated in the logical copy relationship.

Once the logical copy relationship is established and the data from the temporary file 22 is being copied to the file 4, the logical copy manager 16 will manage the background copy operation. In embodiments where the file 4 is a sequential file, any new writes are appended to the end of the file and reads will start reading from the beginning of the file. If a read tries to read from a location in a logical copy relationship that has not yet received the data from the temporary file 22, then the logical copy manager 16 will access the requested data from the temporary file 22 to return to the read request.

With the described embodiments, write requests are allowed to complete even when other requests currently hold the lock for a file by having the write requests complete to a temporary file. The data in the temporary file is copied to the file according to the order in which the write requests writing to the temporary files were received with respect to other read and write requests to maintain data consistency and integrity. Further, with the described embodiments, write requests may complete out of order by writing to the temporary files, while the data in the temporary files is applied to the file according to the order in which the write requests were received and queued in the request queue. To further expedite the processing of requests in the queue, the contents of the temporary file may be written to the file using a logical copy operation to allow the copy operation of the temporary file to complete almost instantly so that further processing of requests are not delayed until the copying of the data from the temporary file to the file completes.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5, 6, 7*a*, 7*b*, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing access to a file, the computer program product comprising a non-transitory computer readable storage medium having computer readable program code embodied therein that executes to perform operations, the operations comprising:

providing a lock to a first request, comprising a read or write request, to access the file;

receiving a second write request while the first request maintains the lock;

creating a temporary file associated with the file for the second write request;

controlling the second write request to write to the temporary file while the lock is held by the first request;

returning write complete to the second write request in response to completing the writing of data for the second write request to the temporary file, wherein the write complete to the second write request is returned out of a write order in which the first request and the second write request were received; and in response to completing the first request, granting the lock to the second write request to write the data in the temporary file to the file, wherein data in the temporary file is applied to the file according to the write order in which the first request and the second write request were received.

2. The computer program product of claim 1, wherein the operations further comprise:

receiving a subsequent write request following the second write request;

determining whether the lock is held;

creating a subsequent temporary file for the subsequent write request in response to determining that the lock is held; and controlling the subsequent write request to write data to the subsequent temporary file.

3. The computer program product of claim 2, wherein the operations further comprise:

returning write complete to each write request writing to one of the temporary files in response to completing the writing of the data for the write request to the temporary file, wherein at least two of the write completes are returned out of a write order in which the completed write requests were received.

4. The computer program product of claim 3, wherein the operations further comprise:

releasing the lock by a releasing request holding the lock;

determining whether there is a closed temporary file to which a write request completed writing data whose data was not written to the file in response to releasing the lock;

writing the data in the determined closed temporary file to the file; and granting the lock to a next request in response to writing the data in the determined closed temporary file.

5. The computer program product of claim 4, wherein data in closed temporary files is written to the file in an order in which the temporary files were created so that data for write requests in the temporary files are written to the file according to an order in which the write requests were received.

6. The computer program product of claim 2, wherein the operations further comprise:

maintaining a queue of received read and write requests indicating an order in which the requests were received;

removing read requests from the queue in response to completing the read requests;

maintaining a placeholder for each of the write requests in the queue in response to returning complete to the write requests not having the lock;

processing the placeholder in the queue in response to a request immediately preceding the placeholder in the queue releasing the lock;

copying data in a least recently created temporary file to the file in response to processing the placeholder; and removing the processed placeholder in the queue in response to copying the data in the least recently created temporary file to the file.

7. The computer program product of claim 2, wherein the operations further comprise:

receiving a subsequent read request following the subsequent write request; and controlling the subsequent read request to read from the file after the write requests received prior to the subsequent read request have their data applied to the file, including write requests writing to temporary files.

8. The computer program product of claim 1, wherein writing the data in the temporary file to the file comprises:

creating a logical copy relationship between locations in the temporary file and locations in the file to which the data in the temporary file is written;

completing the writing of the data in the temporary file to the file in response to creating the logical copy relationship and before the data is written to the temporary file;

copying the data in the temporary file locations to the file locations indicated in the logical copy relationship; and in response to processing a read request to requested locations in the file indicated in the logical copy relationship that have not been updated with the data in the temporary file, accessing the data from the temporary file to return to the read request.

9. A computer program product for managing access to a file, the computer program product comprising a non-transitory computer readable storage medium having computer readable program code embodied therein that executes to perform operations, the operations comprising:

providing a lock to a first request, comprising a read or write request, to access the file;

receiving a second write request while the first request maintains the lock;

creating a temporary file associated with the file for the second write request, wherein the temporary file has same file attributes of the data set and wherein the file and the temporary file comprise sequential files to which data is written sequentially;

controlling the second write request to write to the temporary file while the lock is held by the first request; and in response to completing the first request, granting the lock to the second write request to write the data in the temporary file to the file.

10. A system, comprising:

a processor; and a computer readable storage medium having code executed by the processor to perform operations, the operations comprising:

providing a lock to a first request, comprising a read or write request, to access a file;

receiving a second write request while the first request maintains the lock;

creating a temporary file associated with the file for the second write request;

controlling the second write request to write to the temporary file while the lock is held by the first request;

returning write complete to the second write request in response to completing the writing of data for the second write request to the temporary file, wherein the write complete to the second write request is returned out of a write order in which the first request and the second write request were received; and in response to completing the first request, granting the lock to the second write request to write the data in the temporary file to the file, wherein data in the temporary file is applied to the file according to the write order in which the first request and second write request were received.

11. The system of claim 10, wherein the operations further comprise:
receiving a subsequent write request following the second write request;
determining whether the lock is held;
creating a subsequent temporary file for the subsequent write request in response to determining that the lock is held; and
controlling the subsequent write request to write data to the subsequent temporary file.

12. The system of claim 11, wherein the operations further comprise:
returning write complete to each write request writing to one of the temporary files in response to completing the writing of the data for the write request to the temporary file, wherein at least two of the write completes are returned out of a write order in which the completed write requests were received.

13. The system of claim 12, wherein the operations further comprise:
releasing the lock by a releasing request holding the lock;
determining whether there is a closed temporary file to which a write request completed writing data whose data was not written to the file in response to releasing the lock;
writing the data in the determined closed temporary file to the file; and
granting the lock to a next request in response to writing the data in the determined closed temporary file.

14. The system of claim 11, wherein the operations further comprise:
maintaining a queue of received read and write requests indicating an order in which the requests were received;
removing read requests from the queue in response to completing the read requests;
maintaining a placeholder for each of the write requests in the queue in response to returning complete to the write requests not having the lock;
processing the placeholder in the queue in response to a request immediately preceding the placeholder in the queue releasing the lock;
copying data in a least recently created temporary file to the file in response to processing the placeholder; and
removing the processed placeholder in the queue in response to copying the data in the least recently created temporary file to the file.

15. The system of claim 10, wherein writing the data in the temporary file to the file comprises:
creating a logical copy relationship between locations in the temporary file and locations in the file to which the data in the temporary file is written;
completing the writing of the data in the temporary file to the file in response to creating the logical copy relationship and before the data is written to the temporary file;
copying the data in the temporary file locations to the file locations indicated in the logical copy relationship; and
in response to processing a read request to requested locations in the file indicated in the logical copy relationship that have not been updated with the data in the temporary file, accessing the data from the temporary file to return to the read request.

16. A method for managing access to a file, comprising:
providing a lock to a first request, comprising a read or write request, to access the file;
receiving a second write request while the first request maintains the lock;
creating a temporary file associated with the file for the second write request;
controlling the second write request to write to the temporary file while the lock is held by the first request;
returning write complete to the second write request in response to completing the writing of data for the second write request to the temporary file, wherein the write complete to the second write request is returned out of a write order in which the first request and the second write request were received; and
in response to completing the first request, granting the lock to the second write request to write the data in the temporary file to the file, wherein data in the temporary file is applied to the file according to the write order in which the first request and the second write request were received.

17. The method of claim 16, further comprising:
receiving a subsequent write request following the second write request;
determining whether the lock is held;
creating a subsequent temporary file for the subsequent write request in response to determining that the lock is held; and
controlling the subsequent write request to write data to the subsequent temporary file.

18. The method of claim 17, further comprising:
returning write complete to each write request writing to one of the temporary files in response to completing the writing of the data for the write request to the temporary file, wherein at least two of the write completes are returned out of a write order in which the completed write requests were received.

19. The method of claim 18, further comprising:
releasing the lock by a releasing request holding the lock;
determining whether there is a closed temporary file to which a write request completed writing data whose data was not written to the file in response to releasing the lock;
writing the data in the determined closed temporary file to the file; and
granting the lock to a next request in response to writing the data in the determined closed temporary file.

20. The method of claim 17, further comprising:
maintaining a queue of received read and write requests indicating an order in which the requests were received;
removing read requests from the queue in response to completing the read requests;
maintaining a placeholder for each of the write requests in the queue in response to returning complete to the write requests not having the lock;
processing the placeholder in the queue in response to a request immediately preceding the placeholder in the queue releasing the lock;
copying data in a least recently created temporary file to the file in response to processing the placeholder; and
removing the processed placeholder in the queue in response to copying the data in the least recently created temporary file to the file.

21. The method of claim 16, wherein writing the data in the temporary file to the file comprises:
- creating a logical copy relationship between locations in the temporary file and locations in the file to which the data in the temporary file is written;
- completing the writing of the data in the temporary file to the file in response to creating the logical copy relationship and before the data is written to the temporary file;
- copying the data in the temporary file locations to the file locations indicated in the logical copy relationship; and
- in response to processing a read request to requested locations in the file indicated in the logical copy relationship that have not been updated with the data in the temporary file, accessing the data from the temporary file to return to the read request.

22. A system, comprising:
- a processor; and
- a computer readable storage medium having code executed by the processor to perform operations, the operations comprising:
  - providing a lock to a first request, comprising a read or write request, to access a file;
  - receiving a second write request while the first request maintains the lock;
  - creating a temporary file associated with the file for the second write request, wherein the temporary file has same file attributes of the data set and wherein the file and the temporary file comprise sequential files to which data is written sequentially;
  - controlling the second write request to write to the temporary file while the lock is held by the first request; and
  - in response to completing the first request, granting the lock to the second write request to write the data in the temporary file to the file.

23. A method for managing access to a file, comprising:
- providing a lock to a first request, comprising a read or write request, to access the file;
- receiving a second write request while the first request maintains the lock;
- creating a temporary file associated with the file for the second write request, wherein the temporary file has same file attributes of the data set and wherein the file and the temporary file comprise sequential files to which data is written sequentially;
- controlling the second write request to write to the temporary file while the lock is held by the first request; and
- in response to completing the first request, granting the lock to the second write request to write the data in the temporary file to the file.

* * * * *